United States Patent
Wang et al.

(10) Patent No.: US 10,146,212 B2
(45) Date of Patent: Dec. 4, 2018

(54) MACHINE TOOL FEED DRIVE DESIGN SYSTEM AND METHOD THEREOF

(71) Applicant: INDUSTRIAL TECHNOLOGY RESEARCH INSTITUTE, Hsin-Chu (TW)

(72) Inventors: Chia-Pei Wang, Tainan (TW); Chien-Chih Liao, Taichung (TW); Hsiao-Chen Ho, Taoyuan (TW); Jen-Ji Wang, Taichung (TW)

(73) Assignee: INDUSTRIAL TECHNOLOGY RESEARCH INSTITUTE, Hsin-Chu (TW)

(*) Notice: Subject to any disclaimer, the term of this patent is extended or adjusted under 35 U.S.C. 154(b) by 82 days.

(21) Appl. No.: 15/392,498

(22) Filed: Dec. 28, 2016

(65) Prior Publication Data

US 2018/0136636 A1 May 17, 2018

(30) Foreign Application Priority Data

Nov. 15, 2016 (TW) .............................. 105137316 A

(51) Int. Cl.
G05B 19/416 (2006.01)
B23Q 5/04 (2006.01)
B23Q 5/32 (2006.01)

(52) U.S. Cl.
CPC .............. *G05B 19/416* (2013.01); *B23Q 5/04* (2013.01); *B23Q 5/326* (2013.01); *G05B 2219/49355* (2013.01)

(58) Field of Classification Search
CPC ........ G05B 19/416; G05B 2219/49355; B23Q 5/326; B23Q 5/04
See application file for complete search history.

(56) References Cited

U.S. PATENT DOCUMENTS

| 3,728,595 A | 4/1973 | Adams |
| 4,033,206 A * | 7/1977 | Morita ................. G05B 19/182 |
| | | 700/172 |

(Continued)

FOREIGN PATENT DOCUMENTS

| CN | 101920470 A | 12/2010 |
| CN | 105729304 A | 7/2016 |
| DE | 102010019419 A1 | 11/2011 |
| TW | I453557 B | 9/2014 |

(Continued)

OTHER PUBLICATIONS

Abele, E. et al., Machine tool spindle units, CIRP Annals-Manufacturing Technology, 59.2 (2010): 781-802.

(Continued)

*Primary Examiner* — Ramesh B Patel
(74) *Attorney, Agent, or Firm* — Locke Lord LLP; Tim Tingkang Xia, Esq.

(57) ABSTRACT

A machine tool feed drive design system is provided, which may include a component database, a detection module, a load condition estimation module and a calculation module. The component database may store the specification data of a plurality of feed drive components. The detection module may detect a plurality of operation signals from a machine tool during a period of time when the machine tool had been executing a machining process to a workpiece. The load condition estimation module may calculate a plurality of actual load conditions according to the operation signals and a device specification parameter of a feed drive of the machine tool. The calculation module may select at least one component combination from the feed drive components according to the actual load conditions and the specification data of the feed drive components to serve as an optimized feed drive specification.

20 Claims, 7 Drawing Sheets

(56) References Cited

U.S. PATENT DOCUMENTS

| | | | |
|---|---|---|---|
| 4,131,837 A | 12/1978 | Whetham | |
| 4,894,644 A | 1/1990 | Thomas | |
| 5,952,804 A * | 9/1999 | Hamamura | G05B 19/237 318/560 |
| 6,167,324 A | 12/2000 | Gorman | |
| 6,526,830 B2 | 3/2003 | Scholl et al. | |
| 6,859,674 B1 | 2/2005 | Seth et al. | |
| 8,049,637 B2 | 11/2011 | Tompkins et al. | |
| 8,136,432 B2 | 3/2012 | Travez et al. | |
| 2003/0062342 A1* | 4/2003 | Akiyoshi | B23H 7/16 219/69.16 |
| 2005/0113959 A1* | 5/2005 | Kajiyama | G05B 19/414 700/181 |
| 2010/0145496 A1 | 6/2010 | Tang et al. | |
| 2011/0048146 A1* | 3/2011 | Ou | B23Q 5/40 74/89.23 |
| 2015/0294034 A1* | 10/2015 | Liao | G06F 17/5086 703/1 |
| 2016/0140269 A1* | 5/2016 | Wang | G06F 17/5018 703/1 |
| 2017/0068773 A1* | 3/2017 | Wang | G05B 19/4069 |
| 2017/0308058 A1* | 10/2017 | Kreidler | G05B 19/4069 |

FOREIGN PATENT DOCUMENTS

| | | |
|---|---|---|
| TW | 201539162 A | 10/2015 |
| TW | 201617943 A | 5/2016 |

OTHER PUBLICATIONS

Jemielniak, K., Commercial tool condition monitoring systems, The International Journal of Advanced Manufacturing Technology, 15.10 (1999): 711-721.

Lee, J. M., et al., Real-time tool breakage monitoring for NC milling process, CIRP Annals-Manufacturing Technology, 44.1 (1995): 59-62.

Möhring, H.-C. et al., Process monitoring with sensory machine tool components, CIRP Annals—Manufacturing Technology 59.1 (2010): 383-386.

Prickett, P. W. et al., An overview of approaches to end milling tool monitoring, International Journal of Machine Tools and Manufacture, 39.1 (1999): 105-122.

General Catalogs, Rolling Bearings, NSK, 2005.

Ballscrews, technical information, HIWIN, 2008.

Intellectual Property Office, Ministry of Economic Affairs, R. O. C, "Office Action", dated May 8, 2017, Taiwan.

\* cited by examiner

| Feasibility analysis | Actual load condition | Optimized feed device |
|---|---|---|
| Average torque (N*m) | X X | X X |
| Maximal torque (N*m) | X X | X X |
| Average rotation speed | X X | X X |
| Maximal rotation speed | X X | X X |
| Maximal axial force | X X | X X |

MACHINE TOOL FEED DRIVE DESIGN SYSTEM AND METHOD THEREOF

CROSS REFERENCE TO RELATED APPLICATION

All related applications are incorporated by reference. The present application is based on, and claims priority from, Taiwan Application Serial Number 105137316, filed on Nov. 15, 2016, the disclosure of which is hereby incorporated by reference herein in its entirety.

TECHNICAL FIELD

The technical field relates to a design system, in particular to a machine tool feed drive design system. The technical field further relates to the machine tool feed drive design method of the system.

BACKGROUND

The feed drive of a machine tool plays a very important role when the machine tool is executing a machining process; the performance of the feed drive will directly influence the time of the machine tool executing the machining process, the quality of the surface of the workpiece and the service life of the machine tool.

Currently, if a designer wants to provide a customized machine tool for a customer in order to execute a machining process for a specific workpiece, the designer will usually assume a machining situation for the machining process of the specific workpiece, and then estimate the load conditions needed by all components of the feed drive of the machine tool according to the assumed machining situation. Next, the designer can determine the design conditions and design target of the machine tool. Afterward, the designer will select each of the components of the feed drive of the machine tool, such as screw, motor and bearing, etc., to provide a component combination. And then calculate whether the component combination can satisfy the design target under the design conditions in order to obtain a best component combination. However, the assumed machining situation may not completely conform to the machining process of the specific workpiece; accordingly, the customized machine tool designed according to the assumed machining situation may not satisfy the requirements of the customer.

On the other hand, in order to make the customized machine tool more general-purpose, the designer may design the machine tool for the customer according to various machining situations. However, as the machine tool is designed to be general-purpose, the performance of some components of the machine tool may be too high or too low because the customer only needs to process a specific workpiece, which may increase the cost of the machine tool or influence the performance and the service life of the machine tool.

The customer may already provide his/her requirements for the designer before the designer designs the customized machine tool for the customer. However, the customer may only roughly describe his requirements instead of providing quantization design parameters. Thus, the customized machine tool designed by the designer must not completely conform to the actual requirements of the customer.

SUMMARY

A machine tool feed drive design system is provided, which may include a component database, a detection module, a load condition estimation module and a calculation module. The component database may store the specification data of a plurality of feed drive components. The detection module may detect a plurality of operation signals from a machine tool during a period of time when the machine tool had been executing a machining process to a workpiece. The load condition estimation module may calculate a plurality of actual load conditions according to the operation signals and a device specification parameter of a feed drive of the machine tool. The calculation module may select at least one component combination from the feed drive components according to the actual load conditions and the specification data of the feed drive components to serve as an optimized feed drive specification.

A machine tool feed drive design method is further provided, which may include the following steps: storing specification data of a plurality of feed drive components; detecting a plurality of operation signals from a machine tool during a period of time when the machine tool has been executing a machining process to a workpiece; calculating a plurality of actual load conditions according to the operation signals and a device specification parameter of a feed drive of the machine tool; and selecting at least one component combination from the feed drive components according to the actual load conditions and the specification data of the feed drive components to serve as an optimized feed drive specification.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

Figure 1A:
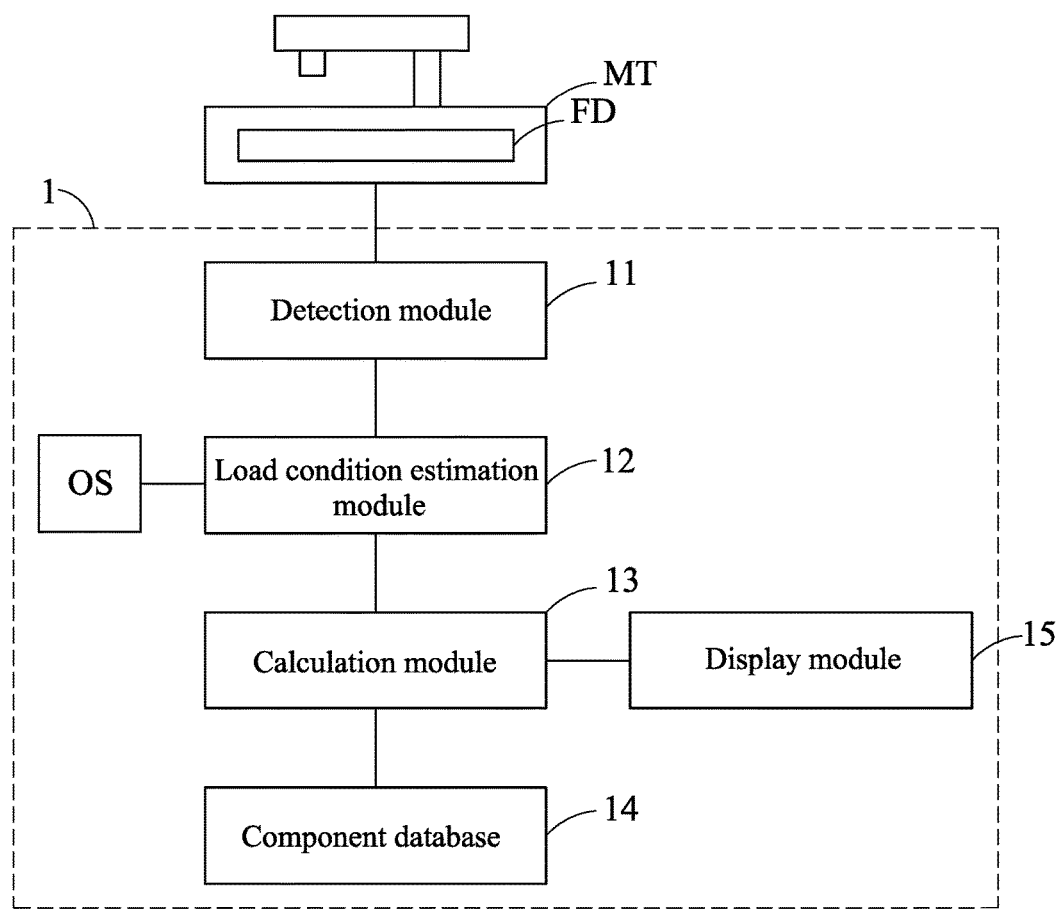
FIG. 1A is a block diagram of a machine tool feed drive design system of a first embodiment in accordance with the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1B:
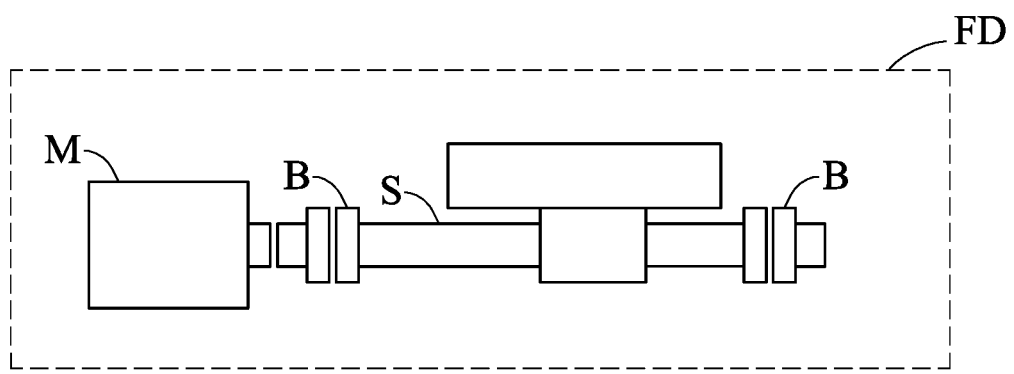
FIG. 1B is a structure diagram of a feed drive of a machine tool of the first embodiment in accordance with the present disclosure.

Please refer to FIG. 1A and FIG. 1B; FIG. 1A is a block diagram of a first embodiment of a machine tool feed drive design system in accordance with the present disclosure; FIG. 1B is a structure diagram of a feed drive of a machine tool of the first embodiment in accordance with the present disclosure. As shown in FIG. 1A, the machine tool feed drive design system 1 may include a component database 14, a detection module 11, a load condition estimation module 12 and a calculation module 13 and a display module 15.

The component database 14 may store the specification data of a plurality of feed drive components; the feed drive components may classified into several categories, and each category may include a plurality of models. The feed drive components may be provided by different manufacturers; the above specification data may specifically describe the specification parameters, the load conditions, the calculation methods, the accuracy life and the like of the of each feed drive component.

The detection module 11 may detect a plurality of operation signals from a machine tool MT during a period of time when the machine tool MT has been executing a machining process to a workpiece, wherein the machine tool MT includes a feed drive FD connected to the detection module 11 and the operation signals are generated by the feed drive FD. As shown in FIG. 1B, the feed drive FD may include a motor M, bearings B and a screw S; the bearings B are disposed at the two ends of the screw S and the motor is connected to the screw S via one of the bearings B. As shown in FIG. 1A, the machine tool feed drive design system 1 can detect various operation signals from the machine tool MT when the machine tool MT is actually executing the machining process instead of using assumed machining situations.

The load condition estimation module 12 may calculate a plurality of actual load conditions according to the operation signals and the device specification parameters OS of the feed drive of the machine tool MT; the device specification parameters OS of the machine tool MT can be provided by its manufacturer.

The calculation module 13 may select several feed drive components most suitable for the actual load conditions from the feed drive components according to the actual load conditions and the specification data of the feed drive components stored in the component database 14 in order to provide a component combination, such that the load conditions of each component of the component combination can really match the above actual load conditions.

The display module 15 may display the component combination as an optimized feed drive specification for the designer's reference. On the other hand, the designer can also replace any one of the components of the optimized feed drive specification with another component according to actual situation, and evaluate the performance of the modified optimized feed drive specification via the machine tool feed drive design system 1.

As described above, the machine tool feed drive design system of the embodiment can detect various operation signals from the machine tool when the machine tool is actually executing the machining process to the workpiece, and then estimate the actual load conditions of the machining process so as to calculate an optimized feed drive specification; in this way, each component of the optimized feed drive specification can match the actual load conditions, so the specification of the designed machine tool can be proper, which can effectively avoid that the performance of some components of the designed machine tool is too high or too low; accordingly, the performance of the designed machine tool can be optimized and the service life of the designed machine tool can be significantly increased.

Figure 2:
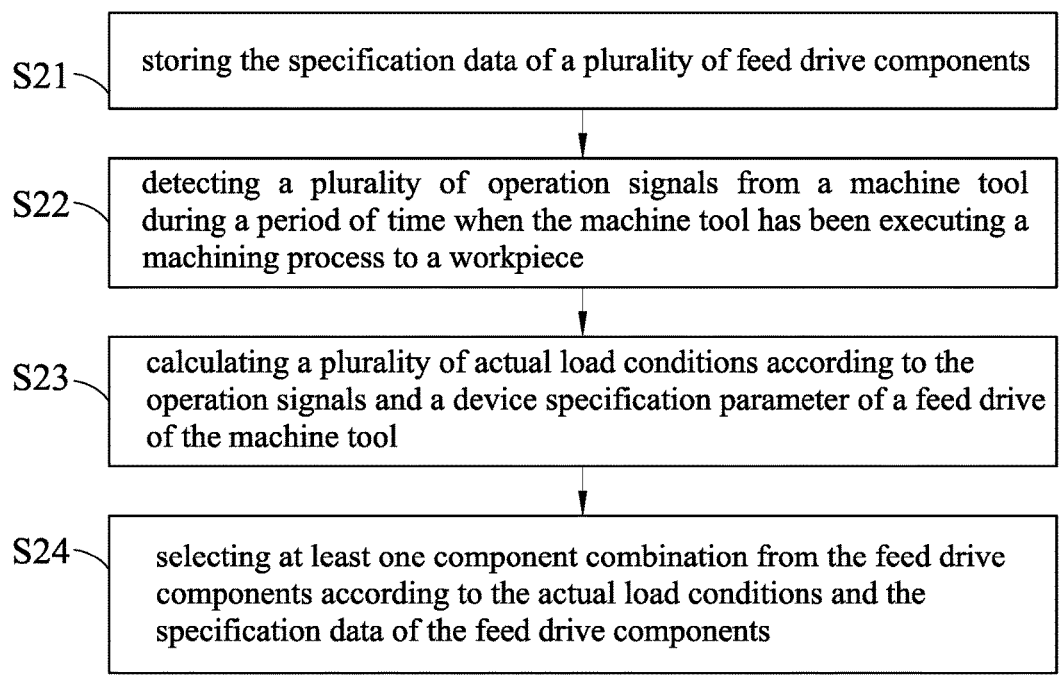
FIG. 2 is a flow chart of a machine tool feed drive design method of the first embodiment in accordance with the present disclosure.

Please refer to FIG. 2, which are a flow chart the machine tool feed drive design method of the first embodiment in accordance with the present disclosure. As shown in FIG. 2, the machine tool feed drive design method of the machine tool feed drive design system 1 of the embodiment may include the following steps:

In the Step S21: storing the specification data of a plurality of feed drive components.

In the Step S22: detecting a plurality of operation signals from a machine tool during a period of time when the machine tool has been executing a machining process to a workpiece.

In the Step S23: calculating a plurality of actual load conditions according to the operation signals and a device specification parameter of a feed drive of the machine tool.

In the Step S24: selecting at least one component combination from the feed drive components according to the actual load conditions and the specification data of the feed drive components.

Figure 3:
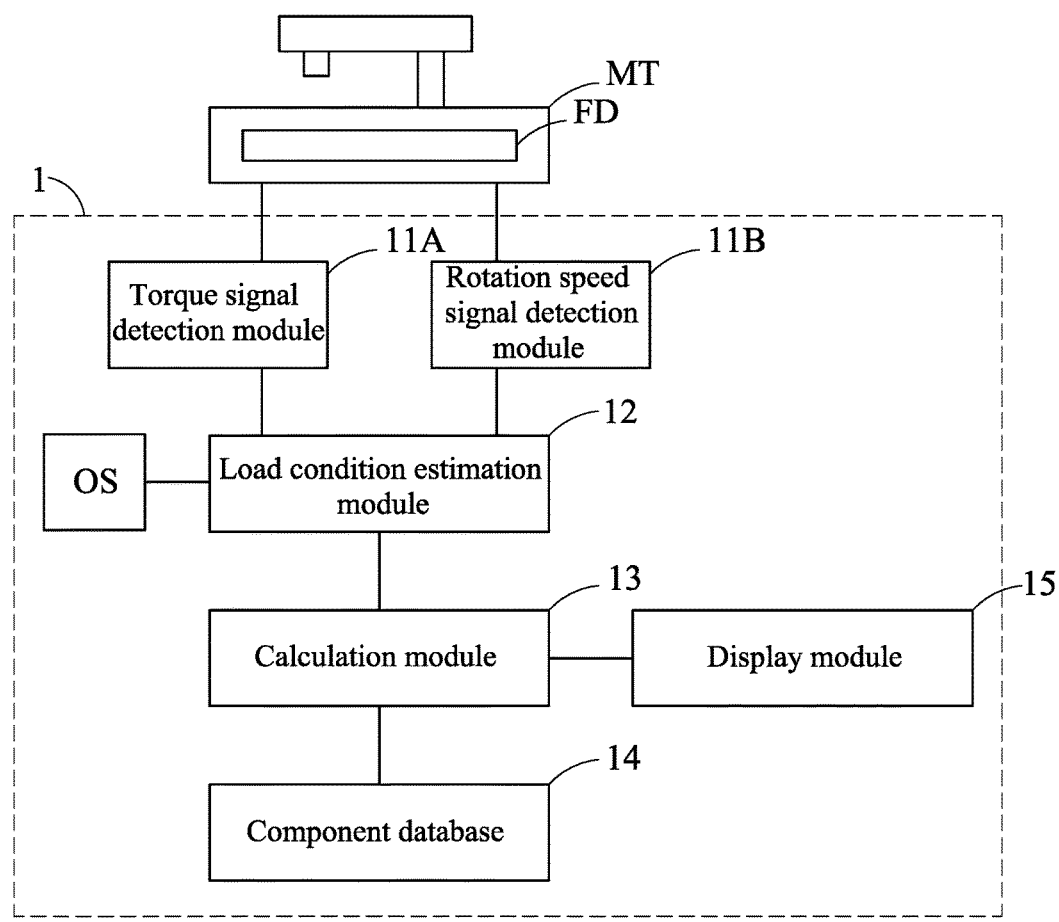
FIG. 3 is a block diagram of a machine tool feed drive design system of a second embodiment in accordance with the present disclosure.

Please refer to FIG. 3, FIG. 4, FIG. 5, FIG. 6A and FIG. 6B. FIG. 3 is a block diagram of a second embodiment of a machine tool feed drive design system in accordance with the present disclosure; FIG. 4, FIG. 5, FIG. 6A and FIG. 6B are a torque distribution diagram, a rotation speed distribution diagram, a device specification diagram and a performance analysis table respectively. As shown in FIG. 3, the machine tool feed drive design system 1 may include a component database 14, a torque signal detection module 11A, a rotation speed signal detection signal 11B, a load condition estimation module 12 and a calculation module 13 and a display module 15.

The component database 14 may store the specification data of a plurality of feed drive components; the feed drive components may be classified into several categories, and each category may include a plurality of models. In the embodiment, the feed drive components may include the screw category, the motor category and the bearing category. The screw category may include a plurality of screws of different models manufactured by different manufacturers; the motor category may include a plurality of motors of different models manufactured by different manufacturers; the bearing category may include a plurality of bearings of different models manufactured by different manufacturers. The specification data of the feed drive components may be provided by their manufacturers, which may specifically describe the specification parameters, the load conditions, the calculation methods, the accuracy life and the like of the of each feed drive component.

The torque signal detection module 11A may detect the torque signal from a machine tool MT during a period of time when the machine tool MT has been executing a machining process to a workpiece, wherein the machine tool MT includes a feed drive FD connected to the torque signal detection module 11A and the torque signal is generated by the feed drive FD; similarly, the rotation speed signal detection module 11B may detect the rotation speed signal from the machine tool MT during the period of time when the machine tool MT has been executing the machining process to the workpiece, wherein the feed drive FD is also connected to the rotation speed signal detection module 11B and the rotation speed signal is generated by the feed drive FD. Thus, the machine tool feed drive design system 1 can actually detect various operation signals from the machine tool MT when the machine tool MT is actually executing the machining process via the torque signal detection module 11A and the rotation speed signal detection module 11B instead of using assumed machining situations.

Figure 4:
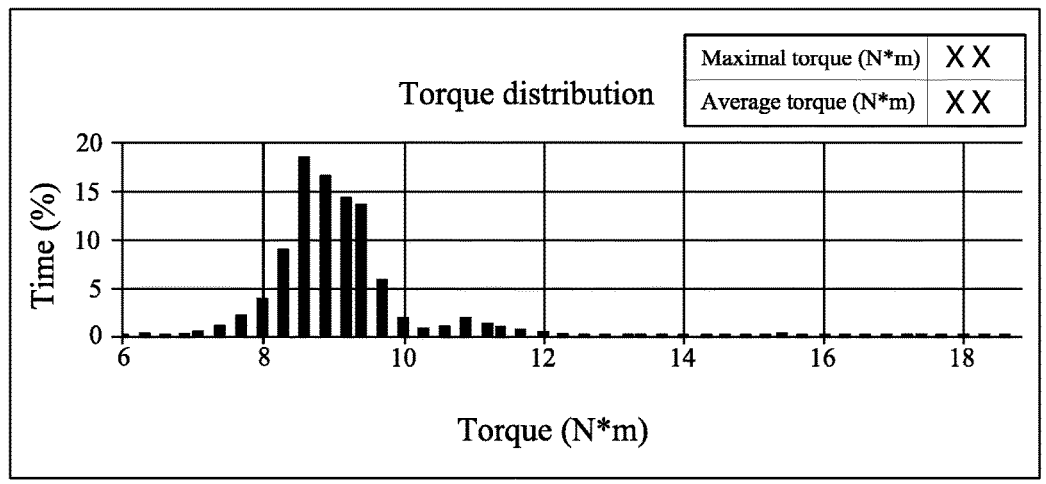
FIG. 4 is a torque distribution diagram of the machine tool feed drive design system of the second embodiment in accordance with the present disclosure.

As shown in FIG. 4, the load condition estimation module 12 may calculate the average torque and the maximal torque according to the time percentage of each of torque values of the torque signal during the period of time when the machine tool MT has been executing the machining process to the workpiece, and then calculate average axial force and the maximal axial force according to the average torque, the maximal torque and the screw reduction ratio of the feed drive of the machine tool MT. The screw reduction ratio and other device specification parameters of the machine tool MT may be provided by its manufacturer.

Figure 5:
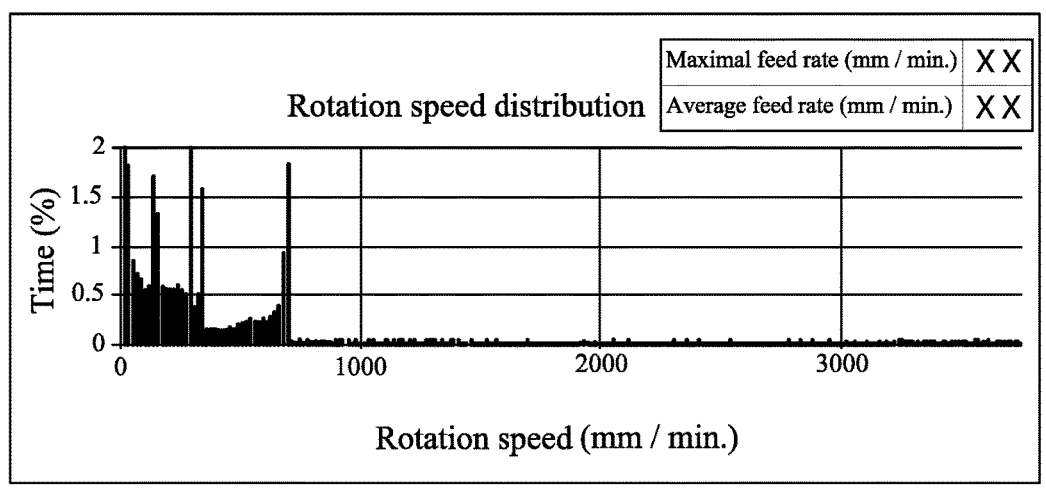
FIG. 5 is a rotation speed distribution diagram of the machine tool feed drive design system of the second embodiment in accordance with the present disclosure.

As shown in FIG. 5, the load condition estimation module 12 may calculate the average rotation speed and the maximal rotation speed according to the time percentage of each of rotation speed values of the rotation speed signal during the period of time when the machine tool MT has been executing the machining process to the workpiece, and then calculate average feed rate and the maximal feed rate according to the average rotation speed, the maximal rotation speed and the screw reduction ratio of the feed drive of the machine tool MT.

As shown in FIG. 3, the calculation module 13 may use, for example, the weighted averaging method to perform a calculation according to the actual load conditions, including the average torque, the maximal torque, the average rotation speed, the maximal rotation speed, the average axial force and the maximal axial force, and the specification data of the feed drive components; then, the calculation module 13 may select some components most suitable for the above actual load conditions from the feed drive components so as to provide a component combination; in this way, the load conditions of each of the components of the component combination can really match the above actual load conditions.

In addition, the calculation module 13 may calculate the accuracy life of each of the feed drive components of feed drive of the machine tool MT according to the above actual load conditions and the device specification parameters OS in order to provide additional actual load conditions. For example, the calculation module 13 may calculate the accuracy life of the bearing of the feed drive according to the average axial force, the maximal axial force and the machine tool MT's device specification parameter relevant to the bearing so as to provide an additional actual load condition.

Figures 6A, 6B:
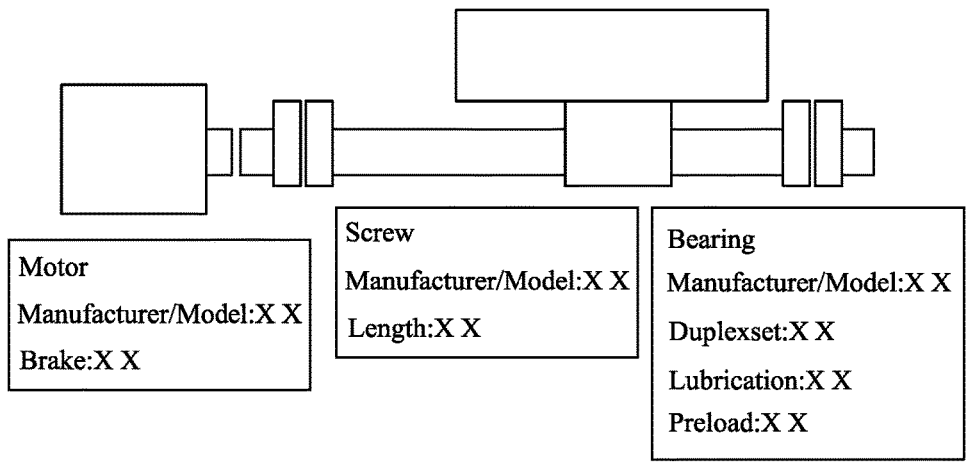
FIG. 6A is a component specification schematic view of the machine tool feed drive design system of the second embodiment in accordance with the present disclosure.
FIG. 6B is a performance analysis table of the machine tool feed drive design system of the second embodiment in accordance with the present disclosure.

As shown in FIG. 6A and FIG. 6B, the display module 15 may display the component combination as an optimized feed drive specification, and list the actual load conditions and the corresponding performances of the optimized feed drive specification for the designer's reference. On the other hand, the designer can also replace any one of the components of the optimized feed drive specification with another component according to actual situation, and then evaluate the performance of the modified optimized feed drive specification via the machine tool feed drive design system 1. In this way, the machine tool designed by the machine tool feed drive design system 1 can further conform to the actual requirements, so the performance of the machine tool can be optimized and its service life can also be increased.

Moreover, the calculation module 13 may also calculate a plurality of component combinations to provide several optimized feed drive specifications for the designer's reference, and the designer can select one of the optimized feed drive specifications according to actual situation, or modify any one of the optimized feed drive specifications and then evaluate the performance of the modified optimized feed drive specification, which can provide more options for the designer to choose from, so is more flexible in use.

It is worthy to point out that if a designer wants to provide a customized machine tool for a customer in order to execute a machining process for a specific workpiece, the designer will usually assume a machining situation for the machining process of the specific workpiece; however, the assumed machining situation may not completely conform to the machining process of the specific workpiece; accordingly, the customized machine tool designed according to the assumed machining situation may not satisfy the requirements of the customer. On the contrary, according to one embodiment of the present invention, the machine tool feed drive design system can detect various operation signals from a machine tool when the machine tool actually had executed a machining process for a workpiece during a period of time, and calculate a plurality of actual load conditions according to the device specification parameters of the feed drive of the machine tool to compare which with the detailed specification data of a plurality of feed drive components in order to provide an optimized component combination as the optimized feed drive specification for the designer's reference; thus, the machine tool feed drive design system can design the machine tool according to the quantization design parameters instead of assumed machining situation, so the designed machine tool can completely conform to the actual requirements.

Besides, the designer may design the machine tool for a customer according to various machining situations; however, as the machine tool is designed to be general-purpose, the performance of some components of the machine tool may be too high or too low because the customer only needs to process a specific workpiece, which may increase the cost of the machine tool or influence the performance and the service life of the machine tool. On the contrary, according to one embodiment of the present invention, the machine tool feed drive design system can measure various operation signals from a machine tool when the machine tool is actually executing a machining process in order to estimate the actual load conditions of executing the machining process, and then calculate an optimized feed drive specification; therefore, all components of the optimized feed drive specification can be proper, so the performance of the designed machine tool can be optimized and the service life thereof can also be increased.

Figure 7:
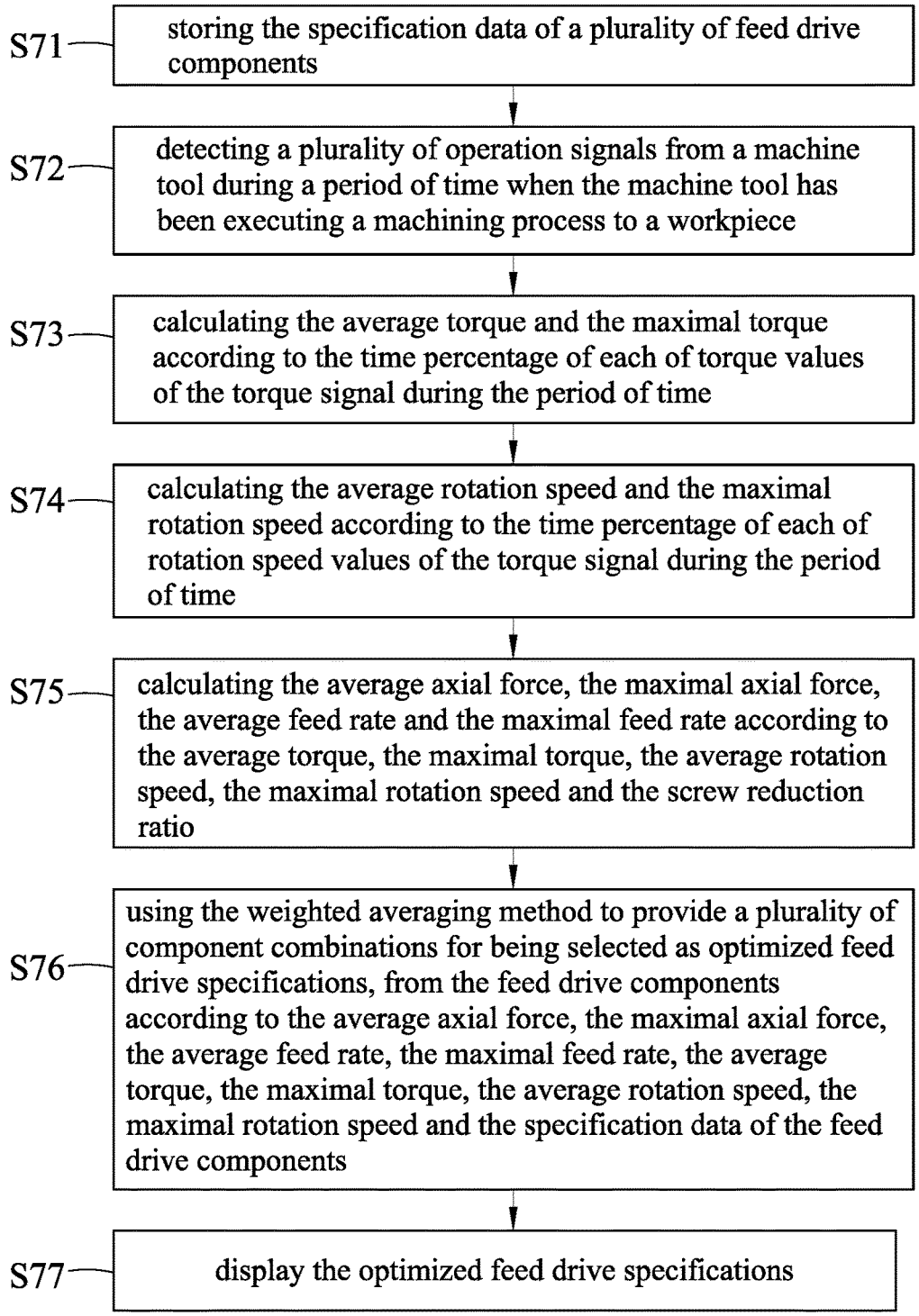
FIG. 7 is a flow chart of a machine tool feed drive design method of the second embodiment in accordance with the present disclosure.

Please refer to FIG. 7, which are a flow chart the machine tool feed drive design method of the second embodiment in accordance with the present disclosure. As shown in FIG. 7, the machine tool feed drive design method of the machine tool feed drive design system 1 of the embodiment may include the following steps:

In the Step S71: storing the specification data of a plurality of feed drive components.

In the Step S72: detecting a plurality of operation signals from a machine tool during a period of time when the machine tool has been executing a machining process to a workpiece.

In the Step S73: calculating the average torque and the maximal torque according to the time percentage of each of torque values of the torque signal during the period of time.

In the Step S74: calculating the average rotation speed and the maximal rotation speed according to the time percentage of each of rotation speed values of the torque signal during the period of time.

In the Step S75: calculating the average axial force, the maximal axial force, the average feed rate and the maximal feed rate according to the average torque, the maximal torque, the average rotation speed, the maximal rotation speed and the screw reduction ratio.

In the Step S76: using the weighted averaging method to provide a plurality of component combinations for being selected as optimized feed drive specifications, from the feed drive components according to the average axial force, the maximal axial force, the average feed rate, the maximal feed rate, the average torque, the maximal torque, the average rotation speed, the maximal rotation speed and the specification data of the feed drive components.

In the Step S77: display the optimized feed drive specifications.

In summation of the description above, the integrated power module according to the exemplary embodiments of the present disclosure may have the following advantages:

(1) According to one embodiment of the present disclosure, the machine tool feed drive design system and method can detect various operation signals from a machine tool when the machine tool actually had executed a machining process for a workpiece during a period of time, and calculate a plurality of actual load conditions according to the device specification parameters of the feed drive of the machine tool to compare which with the detailed specification data of a plurality of feed drive components in order to provide an optimized component combination as the optimized feed drive specification for the designer's reference. Thus, the machine tool feed drive design system and method can design the machine tool according to the quantization design parameters instead of assumed machining situation, so the designed machine tool can completely conform to the actual requirements.

(2) According to one embodiment of the present disclosure, the machine tool feed drive design system and method can measure various operation signals from a machine tool when the machine tool is actually executing a machining process in order to estimate the actual load conditions of executing the machining process, and then calculate an optimized feed drive specification; therefore, all components of the optimized feed drive specification can be proper, so the performance of the designed machine tool can be optimized and the service life thereof can also be increased.

(3) Also, according to one embodiment of the present disclosure, the machine tool feed drive design system and method can provide an optimized feed drive specification as a reference for a designer, and the designer can replace any one of the components of the optimized feed drive specification according to actual situation, and assess the performance of the modified optimized feed drive specification. Therefore, the designed machine tool can more correspond to actual requirements.

(4) Besides, according to one embodiment of the present disclosure, the machine tool feed drive design system and method can provide a plurality of optimized feed drive specifications for a designer's reference, and the designer can select one of the optimized feed drive specifications according to actual situation. Therefore, the machine tool feed drive design system and method can provide more options for the designer to choose from, so can be more flexible in use.

(5) Moreover, according to one embodiment of the present disclosure, the machine tool feed drive design system and method can achieve the desired effects without increasing too much cost. Therefore, the machine tool feed drive design system and method are definitely of high applicability.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A machine tool feed drive design system, comprising:
a component database, configured to store specification data of a plurality of feed drive components;
a detection module, configured to detect a plurality of operation signals from a machine tool during a period of time when the machine tool having been executing a machining process for a workpiece;
a load condition estimation module, configured to calculate a plurality of actual load conditions according to the operation signals and a device specification parameter of a feed drive of the machine tool; and
a calculation module, configured to select at least one component combination from the feed drive components to serve as an optimized feed drive specification according to the actual load conditions and the specification data of the feed drive components, whereby a designer is able to design the feed drive of the machine tool according to the at least one component combination.

2. The machine tool feed drive design system of claim 1, wherein the feed drive components are screw, motor, bearing or a combination thereof.

3. The machine tool feed drive design system of claim 2, wherein the actual load conditions are one or a combination of two or more of an average axial force, a maximal axial force, an average feed rate, a maximal feed rate, an average torque, a maximal torque, an average rotation speed and a maximal rotation speed.

4. The machine tool feed drive design system of claim 3, wherein the load condition estimation module calculates a bearing specification of the feed drive of the machine tool according to the average axial force and the maximal axial force.

5. The machine tool feed drive design system of claim 3, wherein the load condition estimation module calculates the average axial force and the maximal axial force according to the average torque, the maximal torque and the screw reduction ratio.

6. The machine tool feed drive design system of claim 3, wherein the load condition estimation module calculates the average feed rate and the maximal feed rate according to the average rotation speed, the maximal rotation speed and the screw reduction ratio.

7. The machine tool feed drive design system of claim 1, wherein the calculation module uses a weighted averaging method to provide the component combination from the feed drive components according to the actual load conditions and the specification data of the feed drive components.

8. The machine tool feed drive design system of claim 1, wherein the operation signals comprise a torque signal and a rotation speed signal.

9. The machine tool feed drive design system of claim 8, wherein the load condition estimation module calculates the average torque and the maximal torque according to a time percentage of each of torque values of the torque signal during the period of time.

10. The machine tool feed drive design system of claim 8, wherein the load condition estimation module calculates the average rotation speed and the maximal rotation speed according to a time percentage of each of rotation speed values of the torque signal during the period of time.

11. A machine tool feed drive design method, comprising the following steps:
    storing specification data of a plurality of feed drive components;
    detecting a plurality of operation signals from a machine tool during a period of time when the machine tool having been executing a machining process to a workpiece;
    calculating a plurality of actual load conditions according to the operation signals and a device specification parameter of a feed drive of the machine tool; and
    selecting at least one component combination from the feed drive components to serve as an optimized feed drive specification according to the actual load conditions and the specification data of the feed drive components, whereby a designer is able to design the feed drive of the machine tool according to the at least one component combination.

12. The machine tool feed drive design method of claim 11, wherein the feed drive components are screw, motor, bearing or a combination thereof.

13. The machine tool feed drive design method of claim 12, wherein the actual load conditions are one or a combination of two or more of an average axial force, a maximal axial force, an average feed rate, a maximal feed rate, an average torque, a maximal torque, an average rotation speed and a maximal rotation speed.

14. The machine tool feed drive design method of claim 13, further comprising the following step:
    calculating a bearing specification of the feed drive of the machine tool according to the average axial force and the maximal axial force.

15. The machine tool feed drive design method of claim 13, further comprising the following step:
    calculating the average axial force and the maximal axial force according to the average torque, the maximal torque and the screw reduction ratio.

16. The machine tool feed drive design method of claim 13, further comprising the following step:
    calculating the average feed rate and the maximal feed rate according to the average rotation speed, the maximal rotation speed and the screw reduction ratio.

17. The machine tool feed drive design method of claim 11, further comprising the following step:
    using a weighted averaging method to provide the component combination from the feed drive components according to the actual load conditions and the specification data of the feed drive components.

18. The machine tool feed drive design method of claim 11, wherein the operation signals comprise a torque signal and a rotation speed signal.

19. The machine tool feed drive design method of claim 18, further comprising the following step:
    calculating the average torque and the maximal torque according to a time percentage of each of torque values of the torque signal during the period of time.

20. The machine tool feed drive design method of claim 18, further comprising the following step:
    calculating the average rotation speed and the maximal rotation speed according to a time percentage of each of rotation speed values of the torque signal during the period of time.

* * * * *